No. 764,837.

Patented July 12, 1904.

UNITED STATES PATENT OFFICE.

WILHELM BERCHELMANN, OF ELBERFELD, GERMANY, ASSIGNOR TO FARBENFABRIKEN OF ELBERFELD CO., OF NEW YORK, N. Y., A CORPORATION OF NEW YORK.

BLUE ANTHRAQUINONE DYE.

SPECIFICATION forming part of Letters Patent No. 764,837, dated July 12, 1904.

Application filed January 27, 1904. Serial No. 190,873. (No specimens.)

*To all whom it may concern:*

Be it known that I, WILHELM BERCHELMANN, doctor of philosophy, chemist, (assignor to the FARBENFABRIKEN OF ELBERFELD COMPANY, of New York,) residing at Elberfeld, Germany, have invented a new and useful Improvement in Blue Anthraquinone Dyestuffs; and I hereby declare the following to be a clear and exact description of my invention.

My invention relates to the manufacture of new blue dyestuffs of the anthraquinone series, being sulfonic acids of methylamidoalphylamido-beta-methylanthraquinone, having most probably the following general formula:

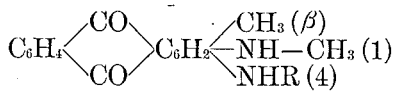

(R meaning in this formula an alphyl radical, such as phenyl, tolyl, xylyl, or the like.) The said anthraquinone derivatives can be obtained, for instance, by first treating methylamido-beta-methylanthraquinone (obtainable from mononitro-beta-methylanthraquinone and methylamin) with bromin; secondly, condensing the resulting monobromo-methylamido-beta-methylanthraquinone with aromatic amins—such as anilin, paratoluidin, xylidin, or the like—and finally treating the methylamidoalphylamido-beta-methylanthraquinones thus obtained with sulfonating agents. The new dyestuff sulfonic acids thus produced are in the shape of their alkaline salts dark powders soluble in water with a blue color. They dye unmordanted wool from acid-baths blue shades.

In order to prepare the new dyestuffs, I can proceed as follows, the parts being by weight: Eight parts of bromin are slowly introduced into a mixture of ten parts of the above-mentioned methylamido-beta-methylanthraquinone in sixty parts of pyridin while stirring. The reaction mass is then heated for some time on the water-bath. On cooling, the brominated compound separates from the liquid in the shape of brownish-red crystals, being insoluble in water and soluble in pyridin and chloroform with a yellowish-red color.

In order to produce the condensation product with paratoluidin, ten parts of monobromomethyl-amido-beta-methylanthraquinone are mixed with one hundred parts of paratoluidin and five parts of anhydrous sodium acetate. This mixture is boiled in a vessel provided with a reflux condenser until it has assumed a clear greenish-blue color which is not changed by further heating. After the reaction mass has been allowed to cool down to about 60° centigrade it is mixed with alcohol, by means of which operation the condensation product separates on cooling in the shape of crystals. For the same purpose the melt can also be poured into an excess of dilute hydrochloric acid. It is filtered off, washed with water, and dried. By recrystallization from pyridin the new compound is obtained in the shape of dark crystals having a metallic luster, which are soluble in pyridin and chloroform with a greenish blue and in glacial acetic acid with a violet-blue color turning bluish red by the addition of concentrated hydrochloric acid. In order to transform this condensation product into the new dyestuff sulfonic acid, ten parts of the finely-pulverized compound are stirred into one hundred parts of sulfuric monohydrate. The resulting solution is then heated to about from 70° to 80° centigrade until a test portion is clearly dissolved by water on the addition of an excess of ammonia. The sulfonation can be carried out in a shorter time and at a lower temperature on adding slowly to the reaction mass a small quantity of fuming sulfuric acid. Subsequently the reaction mass is poured into about one thousand parts of water, by which means the new dyestuff sulfonic acid, which is very difficultly soluble in dilute acids, is precipitated. It is filtered off, washed with a small quantity of cold water, mixed with an excess of ammonia, and dried. When dry and pulverized, the new coloring-matter is in the shape of the ammonium salt thus obtained a dark-blue powder which is soluble in cold and more soluble in hot water with a blue color. It is nearly insoluble in absolute alcohol and in chloroform and soluble in hot pyridin with a greenish-blue color. By the addition of hydrochloric acid to its aqueous solution the color of the latter turns red, and by the addition of ammonia to this acid solution the original blue color is again produced. By concentrated sulfuric acid (of 66° Baumé) it is dissolved with a violet color. It dyes unmordanted wool from acid-baths blue shades.

Having now described my invention and in what manner the same is to be performed, what I claim as new, and desire to secure by Letters Patent, is—

1. The herein-described new dyestuffs, being sulfonic acids of methylamidoalphylamido-beta-methylanthraquinones, which dyestuffs, in the shape of their alkaline salts, are dark powders soluble in water with a blue color, and dyeing unmordanted wool from acid-baths blue shades, substantially as hereinbefore described.

2. The herein-described new dyestuff, being the sulfonic acid of methylamido-para-tolylamido-beta-methylanthraquinone, which dyestuff is, in the shape of its ammonium salt, when dry and pulverized, a dark-blue powder being soluble in cold and more soluble in hot water with a blue color, being nearly insoluble in absolute ethyl alcohol and chloroform and being soluble in hot pyridin with a greenish-blue color; the color of its aqueous solution turning red by the addition of hydrochloric acid and the original blue color being produced again by adding ammonia to the acid solution; being dissolved by concentrated sulfuric acid of 66° Baumé with a violet color; dyeing unmordanted wool from acid-baths blue shades, substantially as hereinbefore described.

In testimony whereof I have signed my name in the presence of two subscribing witnesses.

WILHELM BERCHELMANN.

Witnesses:
   OTTO KÖNIG,
   J. A. RITTERSHAUS.